United States Patent
Park et al.

(10) Patent No.: US 8,737,478 B2
(45) Date of Patent: May 27, 2014

(54) MOTION ESTIMATION APPARATUS AND METHOD

(75) Inventors: Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 282 days.

(21) Appl. No.: 13/297,291

(22) Filed: Nov. 16, 2011

(65) Prior Publication Data

US 2012/0163461 A1 Jun. 28, 2012

(30) Foreign Application Priority Data

Dec. 23, 2010 (KR) .................. 10-2010-0134036

(51) Int. Cl.
*H04N 7/12* (2006.01)
*H04N 11/02* (2006.01)
*H04N 7/26* (2006.01)

(52) U.S. Cl.
CPC ... *H04N 19/00024* (2013.01); *H04N 19/00036* (2013.01); *H04N 7/26037* (2013.01); *H04N 7/26244* (2013.01); *H04N 19/00151* (2013.01)
USPC .................................. 375/240.16; 375/240.2

(58) Field of Classification Search
CPC .......... H04N 7/2676; H04N 19/00151; H04N 7/26244; H04N 19/00024; H04N 19/00036; H04N 7/26037
USPC .................................................... 375/240.16
See application file for complete search history.

(56) References Cited

U.S. PATENT DOCUMENTS

| 6,907,074 B2 | 6/2005 | Park et al. |
| 2005/0047504 A1* | 3/2005 | Sung et al. .................. 375/240.2 |
| 2007/0140344 A1 | 6/2007 | Shima |
| 2008/0247466 A1* | 10/2008 | Wang et al. .............. 375/240.16 |

FOREIGN PATENT DOCUMENTS

KR   10-2000-0023277 A   4/2000

OTHER PUBLICATIONS

Sukho Lee et al, "270 MHz Full HD H.264/AVC High Profile Encoder with Shared Multibank Memory-Based Fast Motion Estimation", ETRI Journal, vol. 31, No. 6, pp. 784-794, Dec. 2009.

* cited by examiner

*Primary Examiner* — Sath V Perungavoor
*Assistant Examiner* — Xiaolan Xu
(74) *Attorney, Agent, or Firm* — Rabin & Berdo, P.C.

(57) ABSTRACT

Disclosed is a motion estimation apparatus and method capable of reduce a memory bandwidth by accessing reference image data occupying the largest part of the memory bandwidth based on a result of motion estimation skip determination. The motion estimation apparatus includes a motion estimation skip determination unit, a sum absolute of absolute difference (SAD) processing unit and a multiplexer (MUX) unit. The motion estimation skip determination unit determines the presence of motion estimation skip by reading current image data and skip reference image data, and outputs a motion vector in a skip mode. The SAD processing unit calculates an SAD value by reading the current image data and reference image data and outputs a motion vector in a normal mode. The MUX unit outputs the motion vector in the skip mode or the motion vector in the normal mode as a final motion vector based on a skip flag signal.

12 Claims, 4 Drawing Sheets

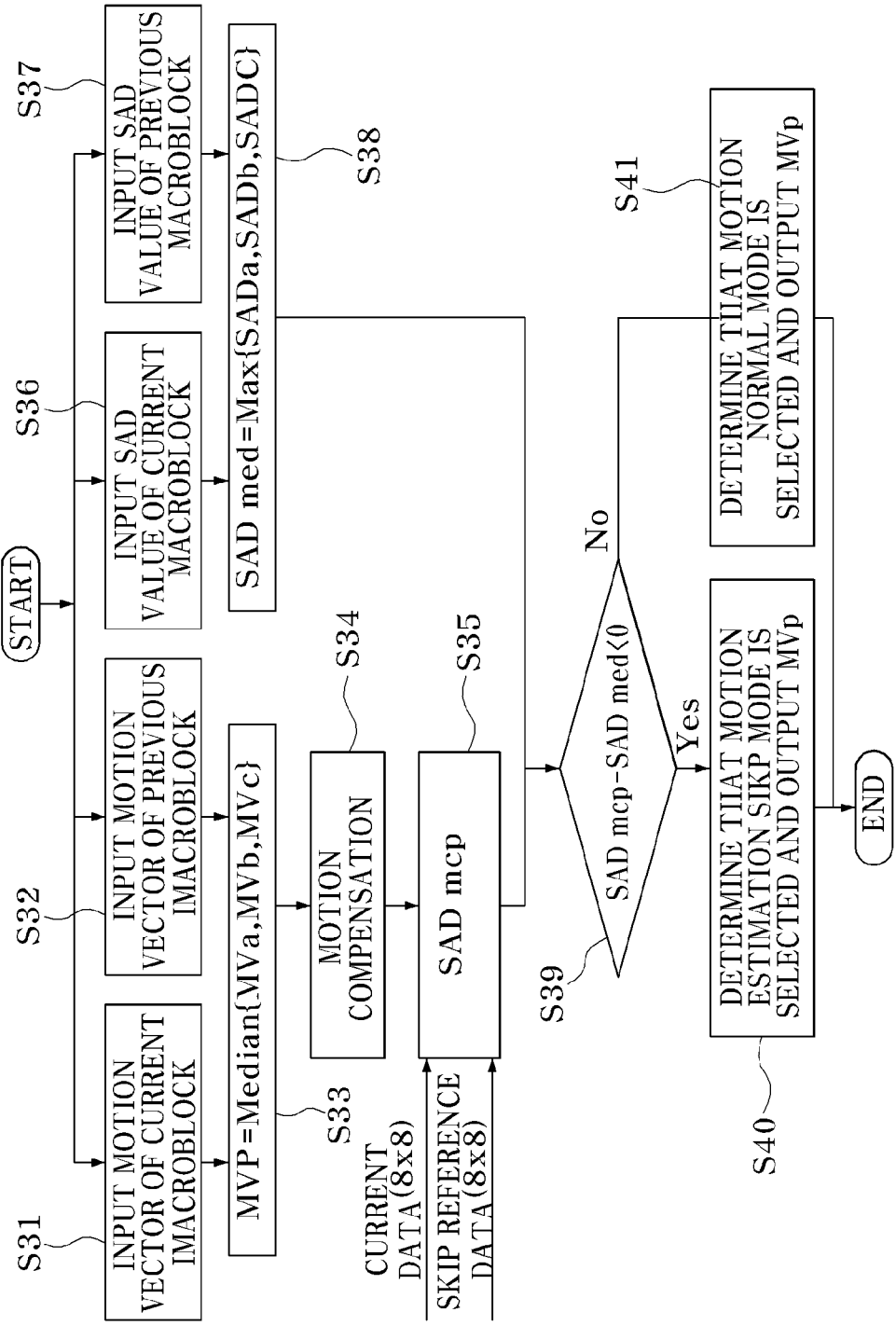

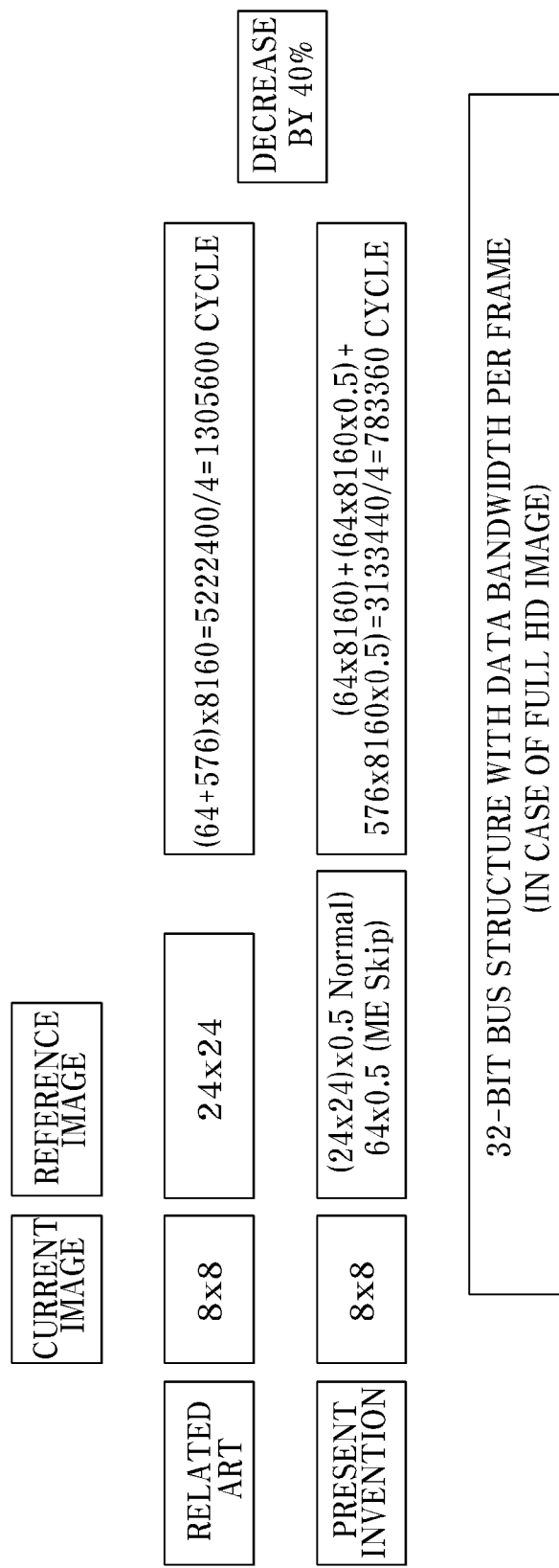

MOTION ESTIMATION APPARATUS AND METHOD

CROSS-REFERENCES TO RELATED APPLICATIONS

The present application claims priority under 35 U.S.C 119(a) to Korean Application No. 10-2010-0134036, filed on Dec. 23, 2010, in the Korean Intellectual Property Office, which is incorporated herein by reference in its entirety set forth in full.

BACKGROUND

Exemplary embodiments of the present invention relate to a motion estimation apparatus and method, and more particularly, to a motion estimation apparatus and method capable of decreasing memory bandwidth in motion estimation for image compression.

H.264 is a standard jointly developed by the Video Coding Experts Group (VCEG) of the International Telecommunications Union (ITU) and the Moving Picture Experts Group (MPEG) of the International Standard Organization (ISO), which establish international standards for moving pictures. H.264 is aimed at achieving a very high compression ratio and is a general-purpose moving picture coding technique that can be used in most transmission media such as recording media, the Internet, satellite broadcasting, etc., and in various moving picture resolution environments.

Traditionally, ITU has established moving picture standards such as H.261, H.263 and H264, on the basis of wired communication media, and MPEG has standardized MPEG-1, MPEG-2 and the like as standards for processing moving pictures in recording media and broadcasting media.

The MPEG has also standardized an MPEG-4 moving picture standard that is a coding standard used in all types of multimedia, and implements various functions characterized by an object-based moving picture code and a high compression ratio. After the establishment of the MPEG-4 moving picture standard, the VCEG of ITU went on to establish a moving picture standard known as H.26L with high compression performance. In MPEG's official comparison test, H.26L, having the same function as MPEG-4 (advanced simple profile), exhibited a superior compression ratio to MPEG-4.

As a result of the test, the MPEG and the VCEG of ITU joined to form the Joint Video Team (JVT) and developed H.264/Advanced Video Coding (AVC) that is a moving picture standard based on H.26L.

The H.264/AVC has a variety of excellent characteristics. Current markets require a System on Chip (SoC) capable of performing processing with high image quality and high resolution. As the resolution increases, data transmissions between external and internal memories frequently occur, which results in performance degradation of the entire system.

The technical configuration described above is a background art for better understanding of the present invention, but is not a prior art well-known in the technical field pertinent to the present invention.

SUMMARY

An embodiment of the present invention relates to a motion estimation apparatus and method capable of reduce a memory bandwidth by accessing reference image data occupying the largest part of the memory bandwidth based on a result of motion estimation skip determination.

In one embodiment, a motion estimation apparatus includes a motion estimation skip determination unit configured to determine the presence of motion estimation skip by reading current image data and skip reference image data and output a motion vector in a skip mode, a sum absolute of absolute difference (SAD) processing unit configured to calculate an SAD value by reading the current image data and reference image data and output a motion vector in a normal mode, and a multiplexer (MUX) unit configured to output the motion vector in the skip mode or the motion vector in the normal mode as a final motion vector based on a skip flag signal.

The skip reference image data may be a macroblock having a size of 8×8.

The motion estimation apparatus may further include a selection unit configured to output the skip flag signal to the Mux unit for selecting the motion vector in the skip mode or the motion vector in the normal mode in the skip mode determination of the motion estimation skip determination unit.

The motion estimation apparatus may further include a first memory configured to store the current image data, and a second memory comprising a first memory bank for storing the skip reference image data and a second memory bank for storing the reference image data.

In another embodiment, a motion estimation method includes reading current image data, reading skip reference image data, calculating a SAD motion compensation prediction (SADmcp) and a median (SADmed) using the current image data and the skip reference image data, comparing the SADmcp and the SADmed, and determining the presence of motion estimation skip based on the compared result, and outputting a motion vector in a skip mode or a motion vector in a normal mode as a final motion vector, based on the determined result.

In the step of determining the presence of motion estimation skip, a motion estimation skip mode may be selected when the SADmcp is smaller than an intermediate result (SADmed).

When it is determined that the motion estimation skip mode is selected, the outputting of the final motion vector may output the motion vector in the skip mode, calculated through the current image data and the skip reference image data, as the final motion vector.

The outputting of the final motion vector may include reading reference image data when it is determined that the normal mode is performed, and calculating a motion vector prediction value in the normal mode using the current image data and the reference image data, and outputting the calculated motion vector in the normal mode as the final motion vector.

The skip reference image data may be a macroblock having a size of 8×8.

As described above, according to the present invention, a memory bandwidth can be reduced by accessing the reference image data occupying the largest part of the memory bandwidth based on a result of motion estimation skip determination.

BRIEF DESCRIPTION OF THE DRAWINGS

The above and other aspects, features and other advantages will be more clearly understood from the following detailed description taken in conjunction with the accompanying drawings, in which:

FIG. 3 is a flowchart illustrating motion estimation skip determination according to the embodiment of the present invention; and FIG. 4 is a diagram comparing a data bandwidth cycle per frame according to the present invention and a data bandwidth cycle per frame according the related art.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
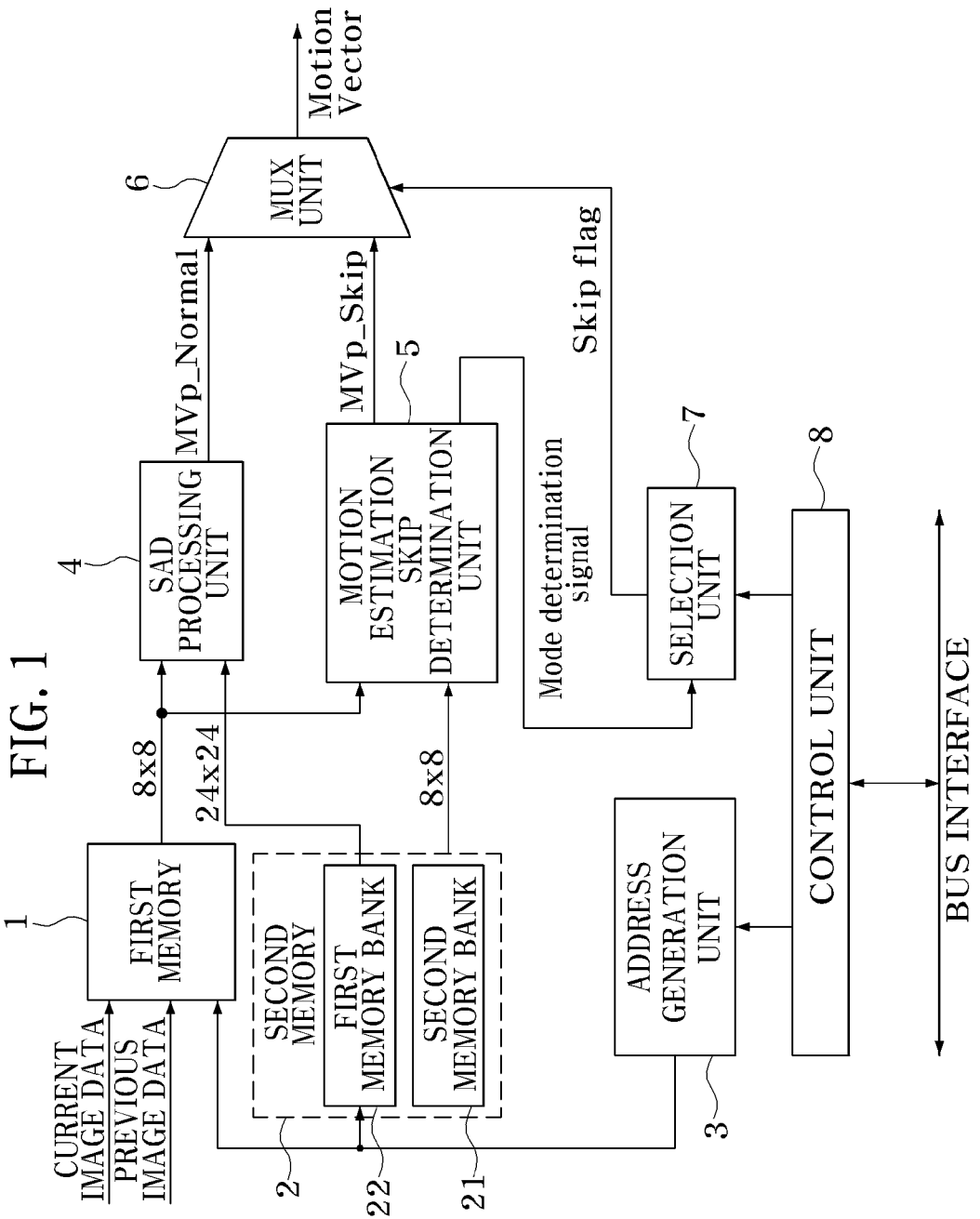
FIG. 1 is a block diagram illustrating a motion estimation apparatus according to an embodiment of the present invention.
Figure 2:
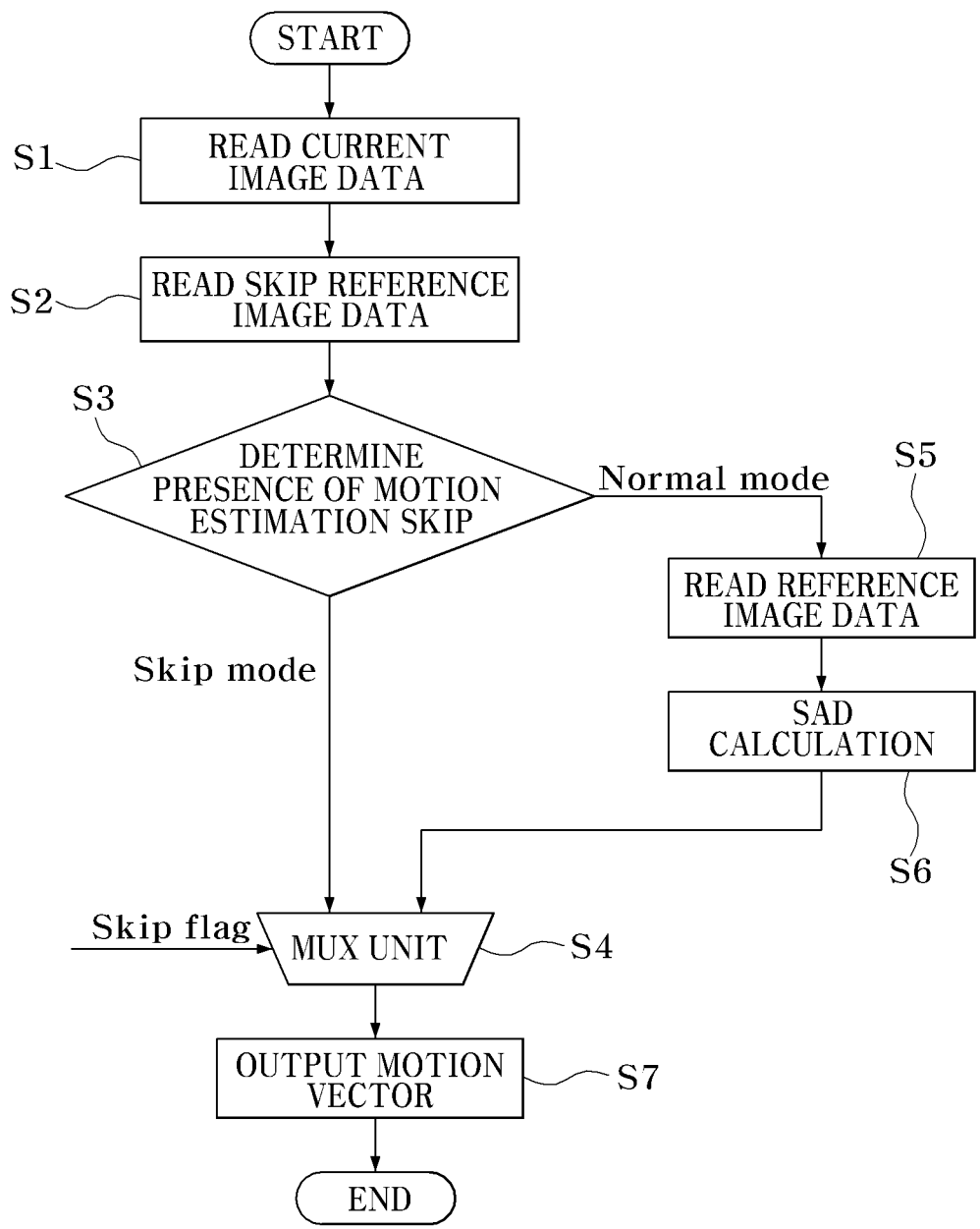
FIG. 2 is a flowchart illustrating a motion estimation method using the motion estimation apparatus according to the embodiment of the present invention.

FIG. 1 is a block diagram illustrating a motion estimation apparatus according to an embodiment of the present invention. FIG. 2 is a flowchart illustrating a motion estimation method using the motion estimation apparatus according to the embodiment of the present invention. FIG. 3 is a flowchart illustrating motion estimation skip determination according to the embodiment of the present invention. FIG. 4 is a diagram comparing a data bandwidth cycle per frame according to the present invention and a data bandwidth cycle per frame according the related art.

Referring to FIGS. 1 to 4, the motion estimation apparatus according to this embodiment includes a first memory 1, a second memory 2, an address generation unit 3, a sum of absolute difference (SAD) processing unit 4, a motion estimation skip determination unit 5, a multiplexer (MUX) unit 6, a selection unit 7 and a control unit 8.

The first memory 1 stores a current image data from which a motion vector MV is to be obtained in the form of a reference block having a size of 8×8.

The second memory 2 is a memory for storing previous image data, and includes a first memory bank 21 for storing skip reference image data in the form of a block having a size of 8×8 and a second memory bank 22 for storing reference image data having a block size of 24×24.

The address generation unit 3 generates an address related to motion estimation and motion compensation and outputs the generated address to the first and second memories 1 and 2 under the control of controller 8.

The motion estimation skip determination unit 5 determines the presence of motion estimation skip by reading the current image data stored in the first memory 1 and the skip reference image data stored in the second memory 2, and outputs a motion vector MVp_Skip (Median Voltage Skip) in a skip mode.

The motion estimation skip determination unit 5 obtains a median MVp of a motion vector of a current macroblock and a motion vector of a previous macroblock by reading the current image data having the block size of 8×8 and the skip reference image data having the block size of 8×8, and performs motion compensation. The motion estimation skip determination unit 5 calculates an SAD motion compensation prediction (SADmcp) as a result of the motion compensation.

Simultaneously, the motion estimation skip determination unit 5 calculates a median SADmed from SAD values of the current macroblock and the previous macroblock. The motion estimation skip determination unit 5 compares the SADmcp and the SADmed and determines the presence of motion estimation skip based on the compared result.

In a case where the SADmcp is smaller than the SADmed, the motion estimation skip determination unit 5 determines that the motion estimation skip is performed.

In the present invention, the motion estimation skip can be determined by reading the skip reference image data having the block size of 8×8 before reading the reference image data having the block size of 24×24.

The SAD processing unit 4 calculates SAD values of blocks by reading the current image data stored in the first memory 1 and the reference image data stored in the second memory 2, and obtains a minimum SAD value from the SAD values. Then, the SAD processing unit 4 outputs a motion vector MVp_Normal in a normal mode to the MUX unit 6.

The MUX unit 6 outputs the motion vector MVp_Skip in the skip mode or the motion vector MVp_Normal in the normal mode as a final motion vector based on a skip flag signal Skip flag.

The selection unit 7 outputs the skip flag signal Skip flag for selecting the motion vector MVp_Skip in the skip mode or the motion vector MVp_Normal in the normal mode based on the motion skip determination of the motion estimation skip unit 5.

A motion estimation method using the motion estimation apparatus according to this embodiment configured described above will be described as follows.

Referring to FIGS. 1 to 3, current image data having a block size of 8×8 is first read from the first memory 1 (S1), and skip reference image data having a block size of 8×8 is then read from the second memory 2 (S2).

Subsequently, the presence of motion estimation skip is determined through the current image data read from the first memory 1 and the skip reference image data read from the second memory 2 (S3).

In the motion estimation skip determination, as illustrated in FIG. 3, a motion vector of a current macroblock (S31) and a motion vector of a previous macroblock (S32) are inputted, and a motion vector median MVp is first obtained from the motion vectors of the current and previous macroblocks (S33). Then, motion compensation is performed (S34), thereby calculating an SADmcp as a result of the motion compensation.

Simultaneously, an SAD value of the current macroblock (S36) and an SAD value of the previous macroblock (S37) are inputted, and a median SADmed is calculated from the SAD values of the current and previous macroblocks (S38).

The SADmcp and the SADmed are compared with each other, and the presence of motion estimation skip is determined based on the compared result (S39).

In a case where the SADmcp is smaller than the SADmed, it is determined that a motion estimation skip mode is performed (S41). In a case where the SADmcp is greater than or identical to the SADmed, it is determined that a normal mode is performed.

If it is determined that the motion estimation skip is performed, as illustrated in FIG. 2, the MUX unit 6 selects a motion vector MVp_Skip in a skip mode based on a skip flag signal Skip flag and outputs the selected motion vector MVp_Skip in the skip mode as a final motion vector MV (S7).

That is, in the motion estimation of the present invention, the motion estimation skip can be determined by reading the skin reference image data having the block size of 8×8 before a reference image data having the block size of 24×24.

Then, If it is determined a normal mode is performed, the reference image data having the block size of 24×24 is read from the second memory 2 (S5).

Subsequently, SAD values of the current and previous macroblocks are calculated, and a motion vector MVp_Normal in a normal mode is outputted to the MUX unit 6 by obtaining a minimum SAD value from the SAD values (S6).

Then, the MUX unit 6 outputs the motion vector MVp_Normal in the normal mode as a final motion vector based on the skip flag signal Skip flag (S7).

As described above, in the motion estimation of the present invention, the presence of motion estimation skip can be determined by reading the skin reference image data having the block size of 8×8 before a reference image data having the block size of 24×24, and the reference image data occupying the largest part of a memory bandwidth is read based on a result of motion estimation skip determination, thereby reducing the memory bandwidth.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A motion estimation apparatus, comprising:
    a motion estimation skip determination unit configured to read current image data and skip reference image data, to determine presence of a motion estimation skip using the current image data and the skip reference image data, and to output a motion vector in a skip mode;
    a sum absolute of absolute difference (SAD) processing unit configured to read reference image data and the current image data, to calculate an SAD value using the current image data and the reference image data, and to output a motion vector in a normal mode, the skip reference image data being of a smaller size than the reference image data; and
    a multiplexer (MUX) unit configured to output one of the motion vector in the skip mode and the motion vector in the normal mode as a final motion vector based on a skip flag signal.

2. The motion estimation apparatus of claim 1, wherein the skip reference image data is a macroblock having a size of 8×8.

3. The motion estimation apparatus of claim 1, further comprising a selection unit configured to output the skip flag signal to the MUX unit for selecting the motion vector in the skip mode or the motion vector in the normal mode in accordance with a skip mode determination of the motion estimation skip determination unit.

4. The motion estimation apparatus of claim 1, further comprising:
    a first memory configured to store the current image data; and
    a second memory comprising a first memory bank for storing the skip reference image data and a second memory bank for storing the reference image data.

5. A motion estimation method, comprising:
    reading current image data;
    reading reference image data;
    reading skip reference image data, the skip reference image data being of a smaller size than the reference image data;
    calculating a SAD motion compensation prediction (SADmcp) using the current image data and the skip reference image data, and calculating a median SAD value (SADmed) using the current image data and the reference image data,
    comparing the SADmcp and the SADmed, and determining presence of a motion estimation skip based on a result of the comparison; and
    outputting one of a motion vector in a skip mode and a motion vector in a normal mode as a final motion vector, based on a result of the determination.

6. The motion estimation method of claim 5, wherein the determining includes selecting the skip mode when the SADmcp is smaller than the SADmed.

7. The motion estimation method of claim 6, wherein the outputting includes outputting the motion vector in the skip mode as the final motion vector when the skip mode is selected.

8. The motion estimation method of claim 5, wherein,
    the determining includes selecting the normal mode when the SADmcp is not smaller than the SADmed, and
    the outputting includes outputting the motion vector in the normal mode as the final motion vector.

9. The motion estimation method of claim 5, wherein the skip reference image data is a macroblock having a size of 8×8.

10. The motion estimation apparatus of claim 1, wherein the reference image data is a macroblock having a size of 24×24.

11. The motion estimation apparatus of claim 1, wherein the SAD value is a minimum value of SAD values of blocks in the current image data and the reference image data.

12. The motion estimation method of claim 5, wherein the reference image data is a macroblock having a size of 24×24.

* * * * *